(12) United States Patent
Murao et al.

(10) Patent No.: US 11,968,478 B2
(45) Date of Patent: Apr. 23, 2024

(54) CAMERA SYSTEM, EVENT RECORDING SYSTEM AND EVENT RECORDING METHOD

(71) Applicant: DENSO CORPORATION, Kariya (JP)

(72) Inventors: Toshikazu Murao, Kariya (JP); Kazuyoshi Akiba, Kariya (JP); Tetsuya Kimata, Kariya (JP); Kazuhiko Kobayashi, Kariya (JP); Takayuki Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/811,227

(22) Filed: Jul. 7, 2022

(65) Prior Publication Data
US 2022/0353476 A1 Nov. 3, 2022

Related U.S. Application Data

(63) Continuation of application No. 16/513,016, filed on Jul. 16, 2019, now Pat. No. 11,425,337.

(30) Foreign Application Priority Data

Jul. 19, 2018 (JP) .................. 2018-135729

(51) Int. Cl.
*H04N 7/18* (2006.01)
*G06V 20/56* (2022.01)
(Continued)

(52) U.S. Cl.
CPC ............. *H04N 7/183* (2013.01); *G06V 20/56* (2022.01); *H04N 1/215* (2013.01); *H04N 9/69* (2013.01);
(Continued)

(58) Field of Classification Search
CPC ...... G06K 9/00791; G06K 9/36; G06V 20/56; G06V 10/20; H04N 1/215; H04N 7/183; H04N 9/69; G07C 5/0891
See application file for complete search history.

(56) References Cited

U.S. PATENT DOCUMENTS 6,088,038 A 7/2000 Edge et al.
6,956,580 B2 10/2005 Rozzi
(Continued)

FOREIGN PATENT DOCUMENTS

JP 2008-236327 A 10/2008
JP 2008282153 A * 11/2008 ........... G06F 9/4831
(Continued)

*Primary Examiner* — Michael Robert Cammarata
(74) *Attorney, Agent, or Firm* — MASCHOFF BRENNAN

(57) ABSTRACT

To reduce complication of a configuration of a vehicle while suppressing an increase in weight of the vehicle, a camera system mounted on a vehicle includes an imaging unit to capture multiple frame images of an outside of the vehicle per cycle and an image processor to obtain the multiple frame images from the imaging unit and separate the multiple frame images into a first given number of frame images as a recognition target and a second given number of frame images as a storage target to be stored in an image recorder. The image processor separately outputs the first and second given numbers of frame images to be recognized and stored, respectively.

7 Claims, 20 Drawing Sheets

(51) Int. Cl.
*G07C 5/08* (2006.01)
*H04N 1/21* (2006.01)
*H04N 9/69* (2023.01)
*H04N 23/745* (2023.01)

(52) U.S. Cl.
CPC ......... *H04N 23/745* (2023.01); *G07C 5/0866* (2013.01)

(56) References Cited

U.S. PATENT DOCUMENTS

| | | |
|---|---|---|
| 7,995,797 B2 | 8/2011 | Muramatsu et al. |
| 8,710,969 B2 | 4/2014 | DeWard et al. |
| 9,365,162 B2 | 6/2016 | Nix |
| 10,052,026 B1 | 8/2018 | Tran |
| 10,427,655 B2 | 10/2019 | Nix |
| 11,212,489 B2 * | 12/2021 | Yoshimura ........... H04N 23/745 |
| 2006/0164514 A1 | 7/2006 | Muramatsu et al. |
| 2008/0263012 A1 | 10/2008 | Jones |
| 2009/0175536 A1 | 7/2009 | Gutta et al. |
| 2010/0157060 A1 | 6/2010 | Muramatsu et al. |
| 2011/0032432 A1 | 2/2011 | Lee |
| 2011/0273565 A1 | 11/2011 | Muramatsu et al. |
| 2011/0317030 A1 | 12/2011 | Ohbuchi et al. |
| 2012/0017232 A1 | 1/2012 | Hoffberg et al. |
| 2012/0036016 A1 | 2/2012 | Hoffberg et al. |
| 2012/0133767 A1 | 5/2012 | Muramatsu et al. |
| 2012/0218412 A1 | 8/2012 | Dellantoni et al. |
| 2014/0078305 A1 | 3/2014 | Muramatsu et al. |
| 2016/0031371 A1 | 2/2016 | Kimata |
| 2016/0105679 A1 | 4/2016 | Murao et al. |
| 2017/0113664 A1 | 4/2017 | Nix |
| 2018/0027222 A1 | 1/2018 | Ogasawara et al. |
| 2018/0070024 A1 | 3/2018 | Marcellin et al. |
| 2019/0102892 A1 | 4/2019 | Kitani |
| 2019/0220011 A1 | 7/2019 | Della Penna |
| 2019/0347487 A1 * | 11/2019 | Booth ................... G06V 10/96 |
| 2019/0391587 A1 | 12/2019 | Uvarov et al. |
| 2020/0029052 A1 | 1/2020 | Murao et al. |

FOREIGN PATENT DOCUMENTS

| | | |
|---|---|---|
| JP | 2009-200726 A | 9/2009 |
| JP | 2011-170595 A | 9/2011 |
| JP | 2013-109639 A | 6/2013 |
| WO | 2014/011552 A1 | 1/2014 |
| WO | 2017/119089 A1 | 7/2017 |
| WO | WO-2019086314 A1 * | 5/2019 ......... G06K 9/00805 |

* cited by examiner

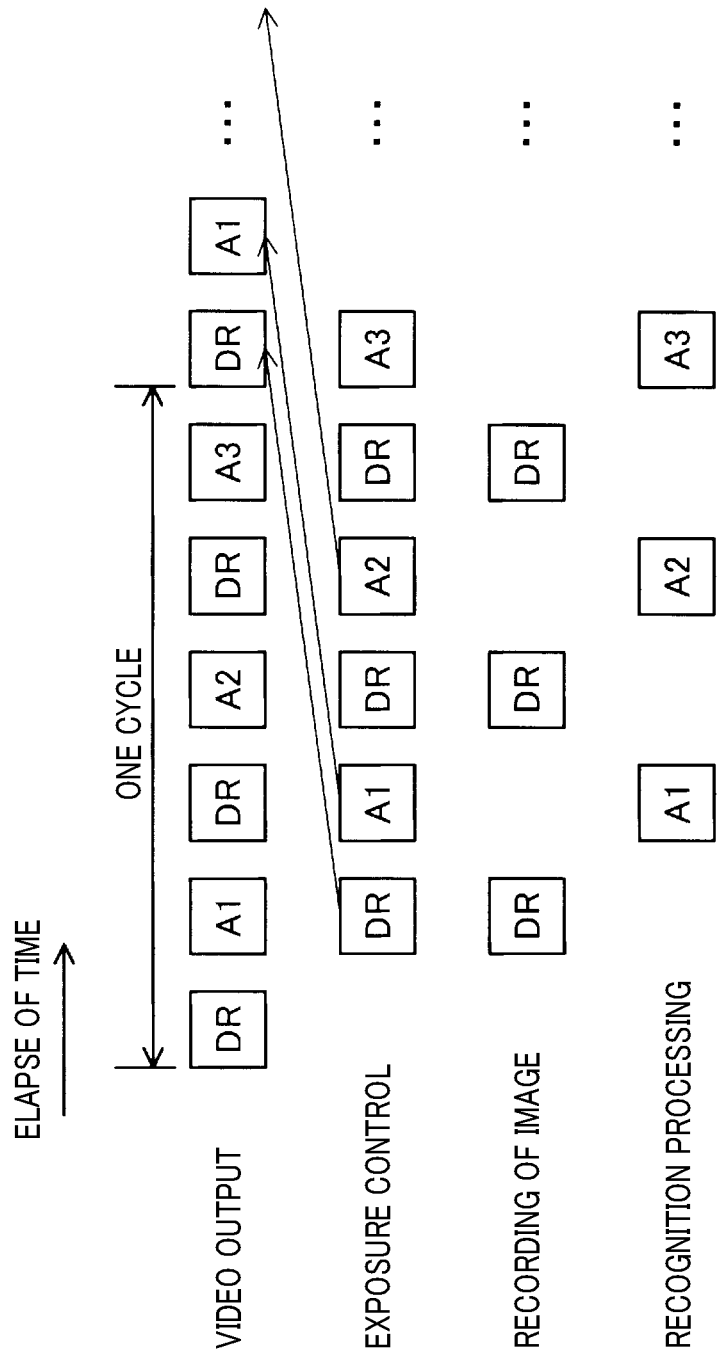

FIG.3

| EVENT | INFORMATION OBTAINED FROM OWN VEHICLE | INFORMATION OBTAINED FROM EXTERNAL EQUIPMENT | |
|---|---|---|---|
| | | PRE-EVENT DATA | POST EVENT DATA |
| DETECTION OF VIBRATION WHEN VEHICLE STOP | FRONT IMAGE, POSITIONAL INFORMATION, TIME, TEMPERATURE, EXPOSURE, CONDITION VEHICLE INFORMATION | — | VIDEO CAPTURED BY SECURITY CAMERA NEAR OWN VEHICLE |
| COLLISION OF OWN VEHICLE | FRONT IMAGE, POSITIONAL INFORMATION, TIME, TEMPERATURE, EXPOSURE, CONDITION VEHICLE INFORMATION | SERVER : WEATHER, TRAFFIC JAM INFORMATION ROAD-VEHICLE : TRAFFIC SIGNAL INFORMATION, IMAGE CAPTURED BY CAMERA AT INTERSECTION VEHICLE-VEHICLE : IMAGE CAPTURED BY CAMERA NEAR OTHER VEHICLE | IMAGE CAPTURED BY CAMERA AROUND OWN VEHICLE (RECORDING OF SECONDARY COLLISION) |
| COLLISION OF OTHER VEHICLE | FRONT IMAGE, POSITIONAL INFORMATION, TIME, TEMPERATURE, EXPOSURE, CONDITION VEHICLE INFORMATION | SERVER : WEATHER, TRAFFIC JAM INFORMATION ROAD-VEHICLE : TRAFFIC SIGNAL INFORMATION, IMAGE CAPTURED BY CAMERA AT INTERSECTION VEHICLE-VEHICLE : IMAGE CAPTURED BY CAMERA NEAR OTHER VEHICLE | PRE-EVENT DATA PLUS IDENTIFICATION INFORMATION OF EVENT ORIGIN |
| ESTIMATION OF COLLISION (INTERSECTION) | FRONT IMAGE, POSITIONAL INFORMATION, TIME, TEMPERATURE, EXPOSURE, CONDITION VEHICLE INFORMATION | SERVER : WEATHER, TRAFFIC JAM INFORMATION ROAD-VEHICLE : TRAFFIC SIGNAL INFORMATION, IMAGE CAPTURED BY CAMERA AT INTERSECTION VEHICLE-VEHICLE : IMAGE CAPTURED BY CAMERA NEAR OTHER VEHICLE | PRE-EVENT DATA PLUS IDENTIFICATION INFORMATION OF EVENT ORIGIN |

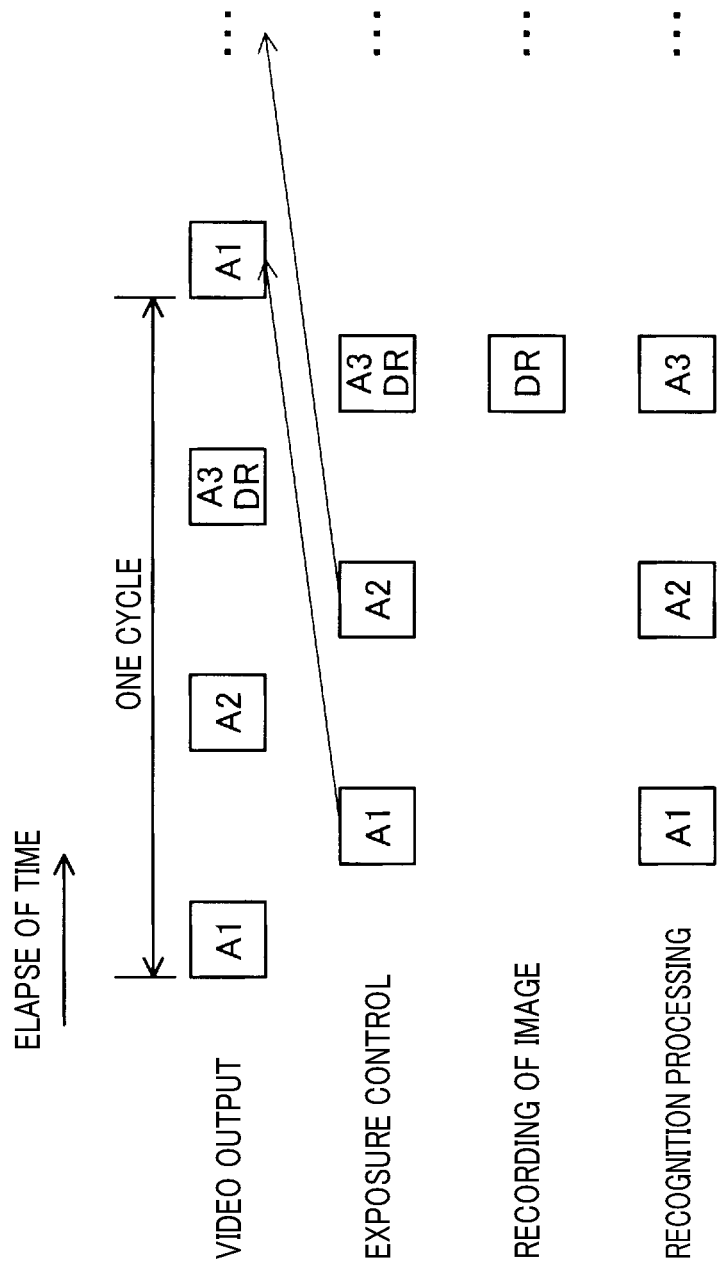

CAMERA SYSTEM, EVENT RECORDING SYSTEM AND EVENT RECORDING METHOD

CROSS-REFERENCE TO RELATED APPLICATION

This patent application is a continuation application of U.S. patent application Ser. No. 16/513,016, filed on Jul. 16, 2019, which is based on and claims priority to Japanese Patent Application No. 2018-135729, filed on Jul. 19, 2018 in the Japan Patent Office, the entire disclosure of which is hereby incorporated by reference herein.

BACKGROUND

Technical Field

Embodiments of the present disclosure relate to a camera system, an event recording system, and an event recording method.

Related Art

In recent years, a driving assistance system is increasingly implemented in a vehicle. In such a driving assistance system, to recognize obstacles and other vehicles or the like, a camera is conventionally installed in the vehicle. Further, as a device to image and make a record of scenes of front and rear sides of the vehicle, either a so-called a dash cam or a drive recorder is widely used. A technology of recording various events occurring in a vehicle has also been proposed, recently.

In general, to achieve vehicle control such as the driver assistance, etc., and recording of various data, various devices are necessarily mounted on the vehicle. As a result, a configuration of the vehicle tends to be complicated while increasing its weight.

Hence, the present disclosure offers the below described various embodiments to solve at least some of the above-described problems.

SUMMARY

Accordingly, one aspect of the present disclosure provides a novel camera system mounted on a vehicle. That is, the camera system is mounted on a vehicle and includes an imaging unit to capture multiple frame images of an outside of the vehicle per cycle and an image processor to obtain the multiple frame images from the imaging unit and separate the multiple frame images into a first given number of frame images as a recognition target and a second given number of frame images as a storage target to be stored in an image recorder. the image processor separately outputs the first and second given numbers of frame images to be recognized and stored, respectively.

Hence, according to the one aspect of the present disclosure, with, since the imaging unit can perform imaging to obtain frame images used as a recognition and storage target by using the control unit, a configuration of the vehicle is not increasingly complicated while either suppressing or reducing the weight of the vehicle.

According to another aspect of the present disclosure, a unique event recording system is provided. That is, the event recording system includes: the above-described camera system; a vehicle controller to perform recognition of the frame image of the recognition target and control the vehicle in accordance with a result of the recognition; and a sensor to detect a behavior of the vehicle. The event recording system also includes a communicator to communicate with an external equipment and obtain external data from the external equipment one of when the sensor unit detects an event related to a behavior of own vehicle and when the external equipment notifies the communicator of an event occurring on the other vehicle related to a behavior of the other vehicle. The external data includes at least one of pre-event data and post event data. The pre-event data represents phenomena existing prior to occurrence of the event, the post event data represents phenomena existing after occurrence of the event. The event recording system also includes a recorder to make a record of the events, the frame images of the storage target, and the external data while associating the events, the frame images of the storage target, and the external data with each other.

Hence, according to the other aspect of the present disclosure, with the event recording system, frame images are captured by the camera system and recognized, the vehicle can be controlled based on the frame images. Besides, when an event related to behavior of the vehicle occurs, the camera system captures frame images to store by associating the frame images with the event. Hence, a configuration of the vehicle is not increased, thereby either suppressing or reducing the weight of the vehicle again.

Yet another aspect of the present disclosure is a method of recording an event by using a camera system mounted on a vehicle. That is, the method includes the steps of capturing multiple frame images of an outside of the vehicle in a given cycle with an imaging unit; obtaining the multiple frame images from the imaging unit to be processed in an image processor; and separating the multiple frame images in the image processor into a first given number of frame images as a recognition target and a second given number of frame images as a storage target to be stored in an image recorder. The method also includes the steps of: separately outputting the first and second given numbers of frame images from each other to be recognized and stored, respectively, from the image processor; receiving the first and second given numbers of frame images in a vehicle controller; and performing recognition of the frame image of the recognition target. The method further includes the steps of: controlling the vehicle in accordance with a result of the recognition; either detecting an event related to a behavior of own vehicle using the sensor or receiving a notification of an event occurring on the other vehicle related to a behavior of the other vehicle from the external equipment; and communicating with an external equipment and obtaining external data from the external equipment via a communicator, wherein the external data includes at least one of pre-event data representing phenomena existing prior to occurrence of the even and post event data representing phenomena existing after occurrence of the event. The method further includes the step of making a record of the events, the frame images of the storage target, and the external data in the recorder while associating the events, the frame images of the storage target, and the external data with each other.

The present disclosure can be achieved in various categories other than the camera system and the event recording system and method. For example, a method of controlling a camera system or an event recording system, a computer program for performing the control method, and a non-transitory computer readable recording medium storing the computer program can achieve the present disclosure as well.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 2 is a diagram illustrating an exemplary imaging system implemented by a camera system in the first embodiment of the present disclosure;

FIG. 3 is a diagram illustrating exemplary data recorded by a recorder in each of various embodiments of the present disclosure;

FIG. 4 is a diagram illustrating an exemplary imaging system implemented by a camera system according to a second embodiment of the present disclosure;

DETAILED DESCRIPTION

Figure 1:
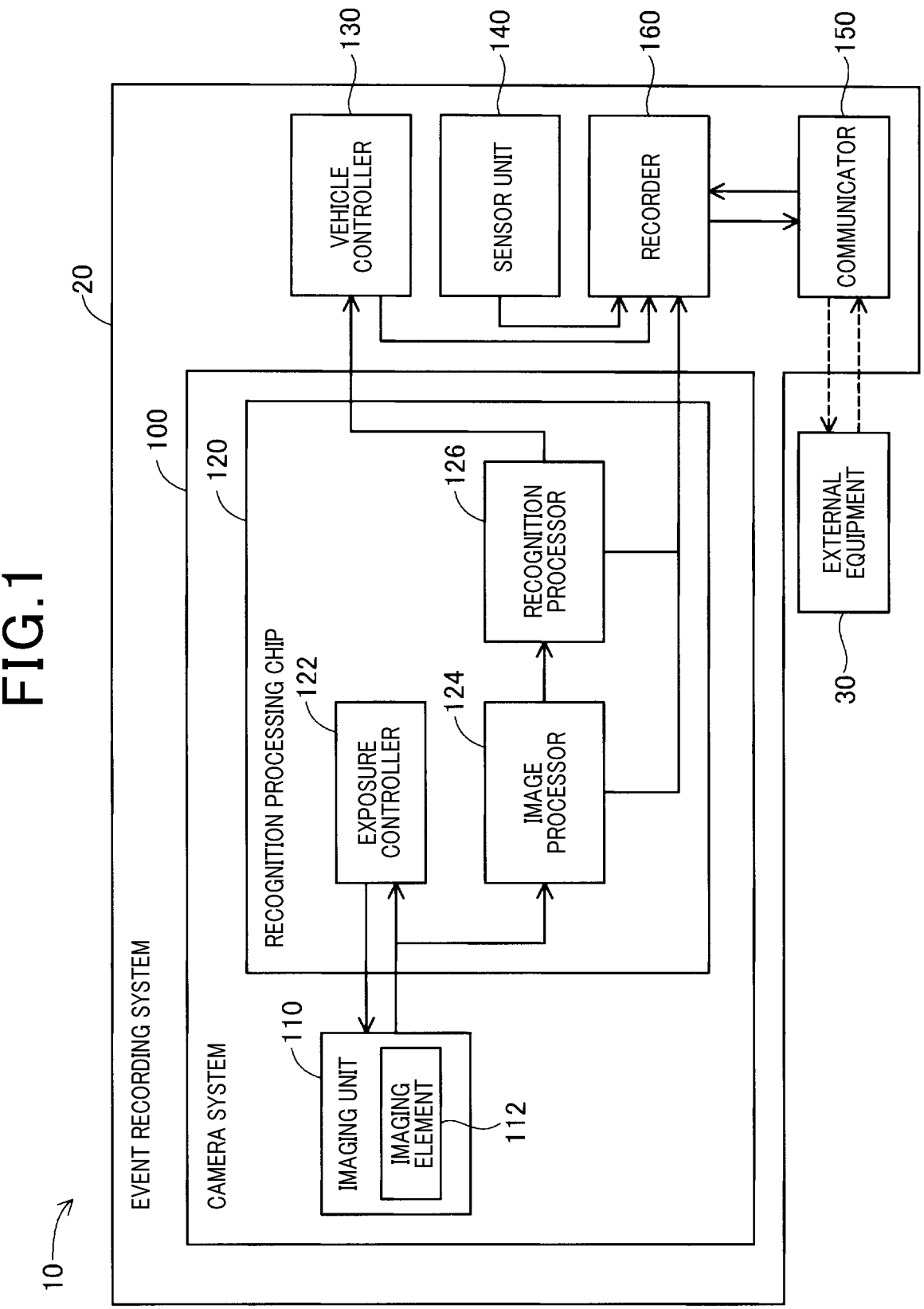
FIG. 1 is a block diagram illustrating an outline configuration of an exemplary vehicle according to a first embodiment of the present disclosure.

Referring now to the drawings, wherein like reference numerals designate identical or corresponding parts throughout the several views thereof, and to FIG. 1 and applicable drawings, an exemplary configuration of a first embodiment of the present disclosure is initially described.

As illustrated in FIG. 1, a vehicle 10 of the first embodiment of the present disclosure includes an event recording system 20. The event recording system 20 is composed of a camera system 100, a vehicle controller 130, and a sensor unit 140. The event recording system 20 also includes a communicator 150 and a recorder 160.

The camera system 100 is mounted on the vehicle 10 as an imaging equipment to image a scene of surroundings of the vehicle 10. In particular, the camera system 100 of this embodiment of the present disclosure images a front scene of the vehicle 10. The camera system 100 includes an imaging unit 110 and a recognition processing chip 120.

By using an imaging element 112 installed in it, the imaging unit 110 performs imaging and obtains multiple frame images in a given cycle at different times, respectively. The imaging unit 110 is desirably an on-board imaging unit to conduct imaging to obtain frame images at a frame rate of 10 to 60 frames per second. In this embodiment of the present disclosure, the imaging unit 110 conducts imaging and obtains forty frame images per second at a regular interval, i.e., 25 ms (millisecond), for example.

The recognition processing chip 120 includes an exposure controller 122, an image processor 124 and a recognition processor 126. The exposure controller 122 conducts exposure control of the imaging element 112. The image processor 124 obtains multiple frame images from the imaging unit 110 and outputs at least a part of the multiple frame images as frame images used in image recognition (i.e., a recognition target). The image processor 124 also outputs a part of the multiple frame images as a storage target to be stored in a recorder 160 separating from the frame images of the recognition target. That is, the image processor 124 obtains the multiple frame images from the imaging unit 110 and separately outputs given frame images used in image recognition and remaining frame images to be stored in the recorder 160 out of the multiple frame images. The recognition processor 126 conducts recognition of objects and signs (e.g., traffic signs) appearing in a given imaging range covered by the imaging unit 110 based on the frame images output from the image processor 124 as the image recognition target. A recognition result obtained by the recognition processor 126 is attached to the frame images to be stored, and the frame images are then output to the vehicle controller 130 and the recorder 160.

The vehicle controller 130 conducts driving support control to help the vehicle 10 to put on a brake, steer and accelerate in accordance with the recognition result of the objects and the signs obtained by the recognition processor 126. In addition to the above-described information obtained by the camera system 100, the vehicle controller 130 may utilize information obtained by at least one of a millimeter-wave Radar and a LiDAR (Light Detection and Ranging) or a fusion of these information to execute the support control.

The sensor unit 140 is a device to detect a behavior of the vehicle 10. The sensor unit 140 includes, for example, an acceleration sensor, a gyro sensor, and a vehicle speed sensor. The sensor unit 140 may include a positioning sensor, a steering angle sensor, and a yaw rate sensor. The sensor unit 140 may further include a temperature sensor and a door sensor to detect states of locking and unlocking of a door or the like.

The communicator 150 is an equipment to communicate with an external equipment 30 wirelessly. For example, the external equipment 30 may include a computer server connected via Internet, an equipment provided in the other vehicle to execute so-called vehicle to vehicle communications, and an equipment to execute so-called road to vehicle communications. The external equipment 30 may also include a mobile device such as a so-called smartphone, etc., carried by a pedestrian. The external equipment 30 may include various records of events therein.

The recorder 160 functions as a drive recorder to make a record of frame images output from the camera system 100 to be stored. Also, the recorder 160 functions as an event data recorder to record information representing a behavior of the vehicle 10 detected by the sensor unit 140. Further, in this embodiment of the present disclosure, the recording unit 160 can make a record of various kinds of data obtained through the communicator 150 together with both of a frame image to be stored and information representing the behavior of the vehicle 10. For example, the recorder 160 may record this information in either a recording medium installed therein or the external equipment 30 wirelessly connected through the communicator 150. Further, the frame image recorded by the recorder 160 as a storage target can be viewed by an image reproduction equipment. Here, the image reproduction equipment may be composed of a monitor installed in either the vehicle 10 or the recorder 160 itself, or a terminal equipment capable of reading a frame image stored in a recording medium detached from the recorder 160, for example.

Now, an exemplary imaging system implemented by the camera system 100 according to one embodiment of the present disclosure is described with reference to FIG. 2. As illustrated on the topmost row of the drawing, it is demonstrated that six sheets of frame images (i.e., a frame image DR, a frame image A1, a frame image DR, a frame image A2, a frame image DR, and a frame image A3) are captured as one cycle. Out of these frame images, three frame images DR are storage targets to be output to the recorder 160. By contrast, the frame images A1, A2, and A3 are used by the recognition processor 126 as recognition targets to perform image recognition. That is, in this embodiment of the present disclosure, multiple frame images captured by the imaging unit 110 per one cycle are partially used in image recognition, and some of the other frame images out of the multiple frame images are used to save. Further, in this embodiment of the present disclosure, each of the frame images to be stored is captured during every interval between (adjacent two) frame images used in image recognition are captured.

The frame image A1 as a recognition target is used, for example, by the recognition processor 126 to identify a car lane. Hence, to be able to recognize the car lane even at night, the exposure controller 122 elongates and sets a relatively longer exposure time. The frame image A2 as a recognition target is used, for example, by the recognition processor 126 to identify characters of the signs. Hence, the exposure controller 122 sets a relatively shorter exposure time suitable for the character recognition. The frame image A3 as a recognition target is used by the recognition processor 126 to detect the object. Hence, to be recognizable both day and night, the exposure controller 122 sets a relatively longer exposure time again. Also, when these frame images A1, A2 and A3 as recognition targets are captured, the exposure controller 122 appropriately adjusts respective exposure times in accordance with brightness of a similar frame image as a recognition target captured in a previous cycle.

Now, exemplary data recorded by the recorder 160 is described with reference to FIG. 3. The recorder 160 may function to make a (first) record of information that represents an event related to a behavior of the vehicle 10, a (second) record of information obtained from an own vehicle when the event occurs (for example, a frame image to be stored), and a (third) record of information obtained from the external equipment 30 when the event occurs. The recorder 160 may associate these records of information with each other before recording.

For example, when an acceleration sensor included in the sensor unit 140 detects vibration in a parked vehicle, the recorder 160 makes a record of event information indicating that the vibration is detected. At the same time, as a record of information obtained from the own vehicle when the vibration is detected, the recorder 160 makes a record of frame images (e.g., front images) captured by the camera system 100 as a storage target, positional information acquired by the positioning sensor, and a time. The recorder 160 also makes a record of temperature obtained by a temperature sensor, exposure conditions used in the camera system 100, and vehicle information as well. The vehicle information includes a steering angle, a vehicle speed, and an acceleration, for example. When the millimeter wave radar, a sonar, and an illuminance meter are installed in the vehicle 10, information obtained from these devices may be included. Further, in addition to the event information indicative of the detection of vibration, the recorder 160 also makes a record of image data of a security camera located near the own vehicle as post event data obtained from the external equipment 30. For example, the vehicle 10 can obtain the image data based on the road-vehicle-communication performed via the communicator 150 when the vibration is detected. Here, the post event data is equivalent to data of various phenomena or matters occurring after detection of the event. Hence, by recording such information in the recorder 160 when the vibration occurs, a status and a situation, in which the vehicle 10 is, for example, stolen can be analyzed based on the information recorded in this way.

Further, the recorder 160 may also make a record of event information indicating collision of the vehicle 10 when the acceleration sensor included in the sensor unit 140 detects such an event that the vehicle 10 collides with an obstacle. At the same time, along with the recording of the event, the recorder 160 may also make a record by collecting similar information from the own vehicle to that recorded when the vibration is detected. Further, the recorder 160 makes a record of information obtained from the external equipment 30 as pre-event data by executing communications with the external server computer, road-vehicle communication, or inter-vehicular (i.e., vehicle-vehicle) communication and the like. Here, the pre-event data is equivalent to data that describes a phenomenon occurring prior to the event. Specifically, when the collision is detected, the vehicle 10 obtains weather information and traffic jam information generated prior to the collision from the external server computer and makes a record of these information. Further, when the collision is detected, by using the road-vehicle communication, the vehicle 10 obtains both of status information that represents a status of a traffic signal before occurrence of the collision from the external equipment 30 and image data generated before occurrence of the collision by a camera installed in an intersection. The vehicle 10 may then make a record of these information. Furthermore, when the collision is detected, by using the inter vehicular communication, the vehicle 10 obtains and makes a record of image data acquired prior to the collision in another vehicle running near the own vehicle therefrom. Further, as information to be obtained from the external equipment 30, the vehicle 10 obtains image data acquired after the collision by the camera installed around the own vehicle via the communicator 150. The vehicle 10 then makes a record of the image data as post event data. That is, the post event data is data to indicate a phenomenon occurring after the event. Since the recorder 160 makes a record of the information along with the detection of collision, and utilizes not only the information of the own vehicle but also different kinds of information obtained from the outside of the own vehicle, a cause of the collision can be quickly analyzed. Herein below, one of pre-event data and post event data obtained from the external equipment 30 is sometimes simply referred to as an external data for simplicity.

Further, the above-described various events can be notified by a given external communication device therefrom. For example, the recorder 160 may receive a notice in that an event happens in another vehicle on a behavior thereof (for example, collisions) via either the inter-vehicle communication or the road to vehicle communication, and similarly makes a record of the above-described various information. In such a situation, an identification number of the vehicle having generated the event is recorded, for example, in association with post event data. Specifically, by recording different kinds of information in the recorder 160 even when the other vehicle has caused the collision, the other vehicle can collect an objective evidence more than that collected by itself, for example. In addition, even when the other vehicle is severely damaged thereby destroying a record in a recorder thereof, a cause of the collision of the other vehicle can be analyzed based on the information recorded in the vehicle 10.

Further, when a fixed-point camera is installed at either an intersection or a curve to estimate occurrence of collision at the point, the recorder 160 may receive a signal indicating the estimation result from a given equipment connected to the fixed camera via a road-vehicle communication and starts making a record of the above-described various information similarly. That is, with this, since an amount of pre-event data to be recorded by the recorder 160 increases, detailed circumstances up to the occurrence of collision can be effectively analyzed.

Hence, as described hereto fore, according to this embodiment of the present disclosure, since the imaging unit 110 can image and obtain both of frame images used in a recognition process as a recognition target and frame images recorded and stored by the recorder 160, complication of the vehicle 10 can be either avoided or reduced while suppressing an increase in weight of the vehicle 10.

Further, according to this embodiment of the present disclosure, driving support can be performed based on frame images captured by a camera system 100 as a recognition target. Further, when an event occurs on a behavior of a vehicle 10, frame images are captured by a camera system 100 to be stored and can be recorded in association with the event. Hence, complication of the vehicle 10 can be either avoided or reduced while suppressing an increase in weight of the vehicle 10 again.

Further, according to this embodiment of the present disclosure, regardless of a state of a start switch of a vehicle 10 (i.e., turned on or turned off), a camera system 100 may perform imaging at all times, and a recorder 160 may similarly record various kinds of data as well. However, when a remaining life of battery acting as a power source for the camera system 100 and the recorder 160 goes below a given level, imaging and recording of data can be stopped.

Further, each of the imaging by the camera system 100 and the recording of the various data by the recorder 160 is not necessarily performed when the starting switch of the vehicle 10 is turned off. In such a situation, each of the imaging by the camera system 100 and the recording of the various data by the recorder 160 can be started upon receiving a wake-up signal from the sensor unit 140 in substantially the same startup process as conventionally implemented when a start switch is turned on to start driving the vehicle 10. It is also possible after the wake-up signal is received that each of the imaging by the camera system 100 and the recording of the various data by the recorder 160 is initiated by quickly starting driving of the vehicle 10 in a given boot mode with a reduced startup time period less than that employed in a normal startup process. In such a startup time reduced mode, for example, a fault detection process such as a functional safety checking process, etc., employed in either the vehicle 10 or various auxiliary equipment for the vehicle 10 may be skipped. Further, the sensor unit 140 can send the wake-up signal when vibration of the vehicle 10 is detected by the acceleration sensor and when a door of the vehicle 10 is unlocked in an abnormal way without using a key or the like.

Further, each of the imaging by the camera system 100 and the recording of the various data by the recorder 160 may be stopped to protect devices when temperature detected by the temperature sensor is a given level or more. In such a high temperature environment, image recognition by the recognition processor 126 can be stopped due to its large processing load while only continuously outputting frame images to be stored.

Now, a second embodiment of the present disclosure is described with reference to FIG. 4. In the first embodiment of the present disclosure illustrated in FIG. 2, the frame images DR are captured to be stored at times (i.e., intervals) between imaging operations of the frame images A1, A2, and A3 of the recognition targets. By contrast, according to the second embodiment of the present disclosure as illustrated in FIG. 4, multiple frame images are captured during one-cycle and are output as frame images to be used in recognition and partially as those to be stored at the same time. That is, in this embodiment of the present disclosure, some of frame images are output as a recognition target and a storage target at the same time so that these frame images are partially commonly used as a recognition and storage target. By controlling in this way, since the imaging unit 110 can perform imaging to obtain frame images serving as recognition and storage targets, complication of the vehicle 10 can be either avoided or reduced while suppressing an increase in weight of the vehicle 10. The remaining configurations of the vehicle 10 and a camera system 100 employed in the second embodiment of the present disclosure are substantially the same as those of the first embodiment of the present disclosure.

Now, a third embodiment of the present disclosure is described with reference to FIG. 5. In the third embodiment of the present disclosure, the image processing section 124 differently applies tone correction to respective frame images of the recognition and storage targets. However, respective configurations of the vehicle 10 and the camera system 100 of the third embodiment are substantially the same as those of the first embodiment of the present disclosure. Further, a method of imaging each of respective frame images as recognition and storage targets is substantially the same as that implemented in the second embodiment of the present disclosure. That is, in this embodiment of the present disclosure, the image processor 124 again outputs some of frame images to be used in both of recognition and saving similarly to the second embodiment of the present disclosure.

Figure 5:
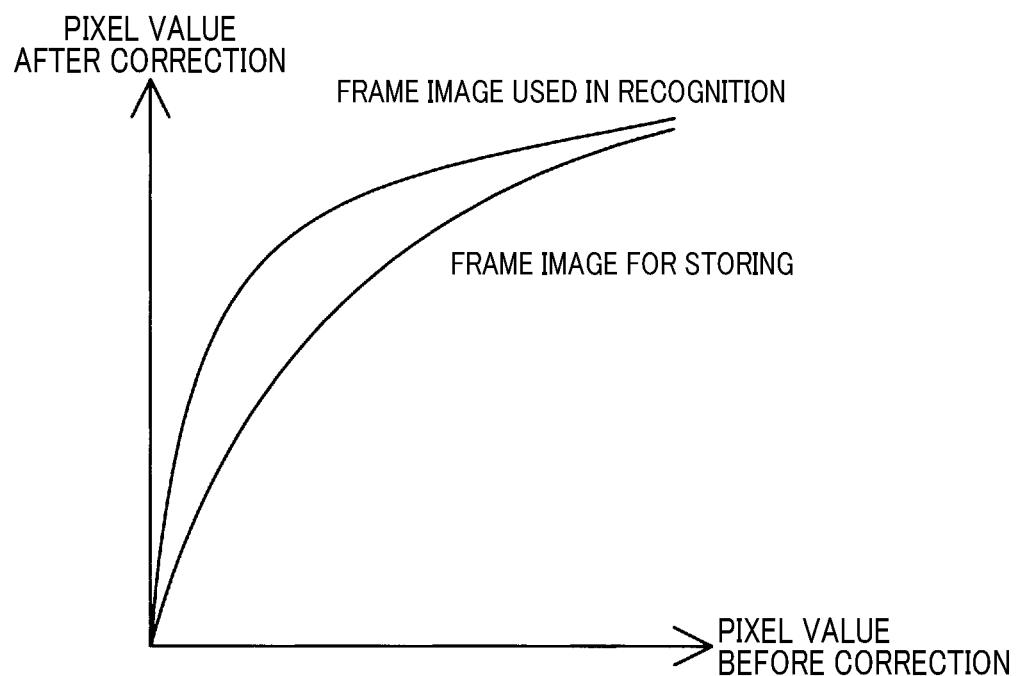
FIG. 5 is a diagram illustrating exemplary characteristics of frame images respectively used as saving and recognition targets according to one embodiment of the present disclosure.

In FIG. 5, exemplary image characteristics of respective frame images of recognition and storage targets are illustrated. As illustrated there, in this embodiment of the present disclosure, a process of enhancing a luminance is applied to a low brightness region of the frame image of the recognition target to be higher than that of the frame image of the storage target. This is because, accuracy of recognition of the frame image as the recognition target can be enhanced when a brightness of a dark region thereof is corrected to be lighter. However, since when the luminance of the low brightness region of the frame image to be stored is enhanced, quality of an image deviates from an actual tone and the image is not suitable for both of viewing and analyzing usages. Hence, in this embodiment of the present disclosure, the image processor 124 applies different tone adjustments to the frame images of the recognition and storage targets, respectively.

Figure 6:
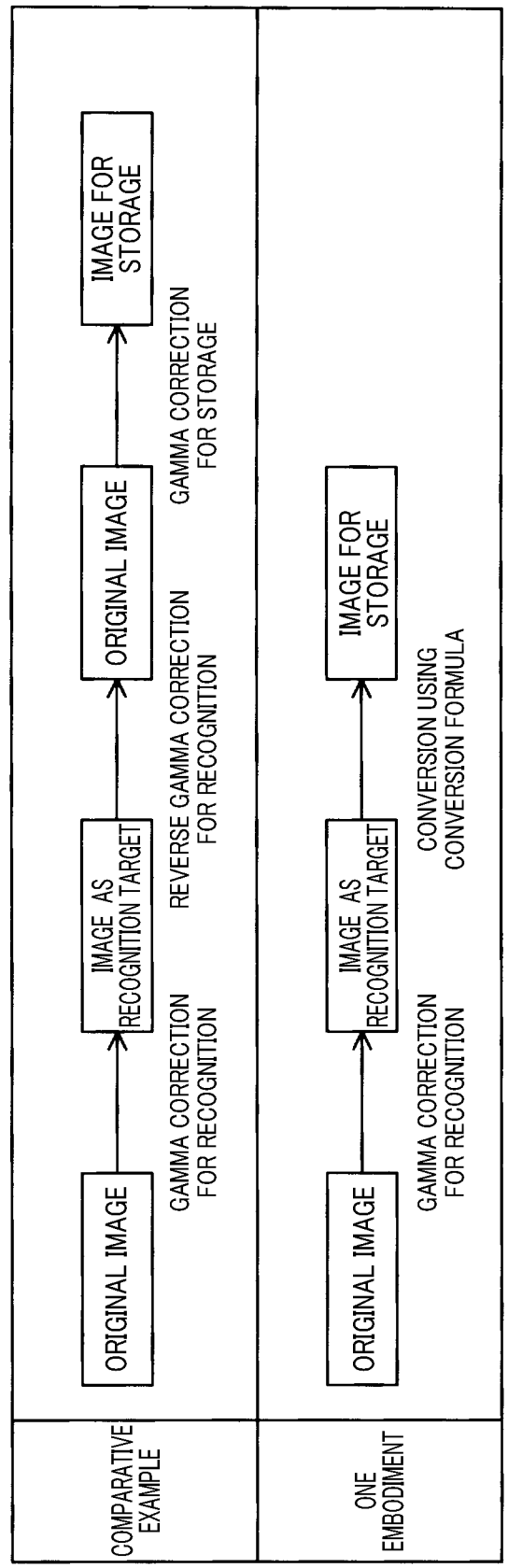
FIG. 6 is a diagram illustrating exemplary tone correction processing according to a third embodiment of the present disclosure.

FIG. 6 illustrates an exemplary sequence of obtaining the image characteristics illustrated in FIG. 5. As illustrated there, in a tone correction process employed in a comparative example, the image processor 124 applies (e.g., a first) gamma correction to an original frame image captured by the imaging unit 110, thereby generating the frame image as a recognition target with the characteristics illustrated in FIG. 5. The image processor 124 then applies reverse gamma correction to the frame image of the recognition target with the characteristics of FIG. 5 to once bring the tone thereof back to that of the original frame image. The image processing section 124 then applies (e.g., a second) gamma correction to the frame image of the recognition target having been subjected to the reverse gamma correction, thereby generating a frame image of the storage target with characteristics of FIG. 5. By contrast, according to this embodiment of the present disclosure, the image processor 124 similarly applies the gamma correction to an original frame image (captured by the imaging unit 110), thereby generating the frame image of the recognition target with the characteristics of FIG. 5. However, the image processor 124 then uniquely applies color conversion to the frame image of the recognition target having been subjected to the gamma correction by using a given conversion formula, thereby directly generating the frame image of the storage target with the characteristics of FIG. 5. The conversion formula is prepared in advance, for example, such that ideal frame images used in both of recognition and saving purposes are generated respectively based on original images of the same scene, and an expression capable of filling up a gap between tones of respective ideal frame images is calculated as the conversion formula and stored as one of internal data. Here, multiple kinds of the conversion formulas may be similarly prepared in accordance with exposure conditions on which the original frame image is obtained (captured) so that the image processor 124 can switch a formula to an appropriate formula in accordance with the exposure condition thereof. Although this embodiment of the present disclosure applies the gamma correction to the original frame image to generate the frame image of the recognition target based on the original frame image, the present disclosure is not limited thereto, and other image correction, such as brightness correction, contrast correction, etc., can be similarly applied to the original frame image to generate the frame image of the recognition target. Further, the image correction to generate the recognition frame image is not limited to one kind, and multiple different kinds of the image correction may be employed.

As described heretofore, according to the tone correction process of the third embodiment of the present disclosure, a process of applying the reverse gamma correction to the frame image of the recognition target to reproduce the original frame image again becomes unnecessary after generating the frame image of the recognition target. As a result, a processing load on the image processor 124 can effectively be reduced.

Further, in this embodiment of the present disclosure, the image processor 124 can determine when it is either day or night, for example, when the original frame image is captured by conducting automatic exposure processing. That is, the image processor 124 can accordingly switch a conversion formula to produce the frame image of the storage target based on the determination result. Furthermore, the image processor 124 can apply automatic white balance processing and color reproduction processing to the frame image of the storage target in accordance with a result of detecting color temperature of a road surface in the automatic white balance process.

Further, the image processing unit 124 may not apply color matrix processing to a frame image of the recognition target, while applying the color matrix processing to a frame image of the storage target. With this, an impact of noise generated by the color matrix processing on recognition processing of the recognition processor 126 can be suppressed while improving color reproducibility of the frame image.

Figure 7:
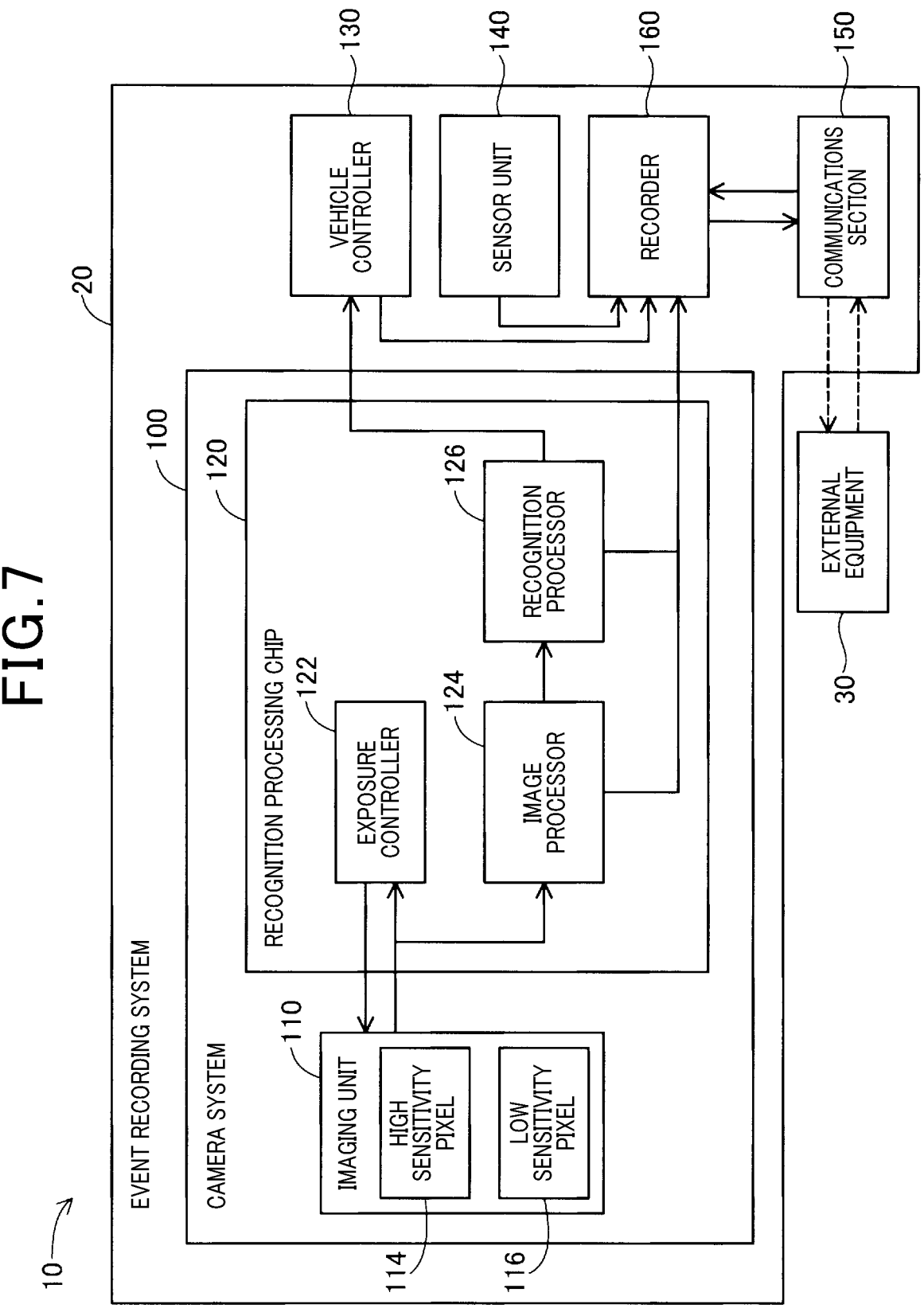
FIG. 7 is a block diagram illustrating an exemplary outline configuration of a vehicle according to a fourth embodiment of the present disclosure.

Now, a fourth embodiment of the present disclosure is described with reference to FIG. 7. As illustrated in FIG. 7, according to the fourth embodiment of the present disclosure, the imaging unit 110 includes a first photodetector 114 having a high sensitivity pixel and a second photodetector 116 having a low sensitivity pixel with sensitivity lower than the high sensitivity pixel. A light receiving area of the first photodetector 114 is set larger than that of the second photodetector. Then, in the camera system 100 of this embodiment of the present disclosure, both of the high sensitivity pixel and the low sensitivity pixel are utilized to produce an HDR (high dynamic range) image while applying flicker suppression processing thereto. Here, the HDR means that a dynamic range of the image is expanded.

Now, an exemplary imaging system according to one embodiment of the present disclosure is herein below described with reference to a timing chart illustrated in FIG. 8. First, it is supposed in the embodiment of the present disclosure that a traffic signal placed on a road repeatedly blinks at an interval of 10 ms (millisecond) with a duty cycle of 50% in a turn on state. It is also supposed that an interval between imaging operations of the imaging unit 110 is 25 ms (i.e., 40 fps (frames per second)). A light source of the traffic signal is composed of, for example, a light-emitting diode. In the imaging system illustrated in FIG. 8, since an imaging cycle of the imaging unit 110 is different from an integer multiple of a blinking cycle of the traffic signal as illustrated, these cycles are asynchronous with each other. Here, the imaging cycle of the imaging unit 110 can be a cycle that rarely synchronizes with the light blinking cycle of the traffic signal such as 36.7 ms (27.5 fps), etc.

Figure 8:
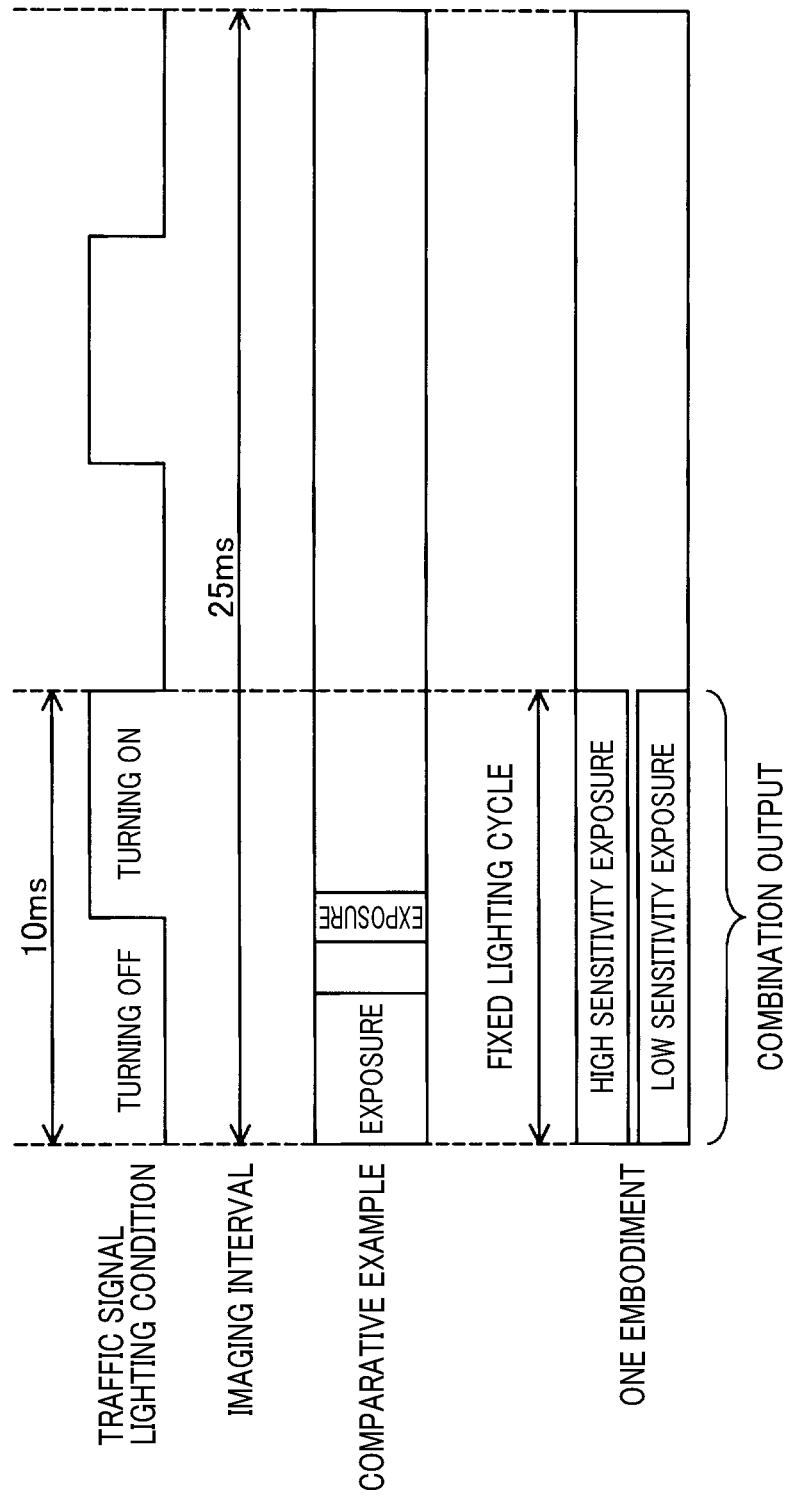
FIG. 8 is a diagram illustrating an exemplary flicker suppression function of the vehicle of the fourth embodiment of the present disclosure.

Further, in FIG. 8, an imaging system of a comparative example illustrates a process in which the imaging unit 110 employed in the first embodiment of the present disclosure brings an image into the HDR. That is, in the imaging system of the comparative example, since the imaging unit 110 has only one type of an imaging element 112, an exposure time period is initially set longer to capture a bright image. After the bright image is captured, the exposure time period is shortened to capture a dark image. After that, these images obtained by imaging at respective time periods in this way are combined, thereby completing the HDR. However, when implementing such an imaging system, the exposure is likely to occur when a traffic signal is turned off as illustrated in FIG. 8. As a result, although the imaging has been executed when the traffic signal is lighting, the traffic signal is turned off in an image actually captured, thereby generating a so-called flicker.

In this respect, in the embodiment of the present disclosure, since the photodetectors 114 and 116 of the imaging unit 110 include the high-sensitivity pixel and the low sensitivity pixel, respectively, the imaging unit 110 executes exposure by using these high-sensitivity and the low sensitivity pixels at the same time for a time period equivalent to one cycle of the traffic signal. Then, images captured by using the high-sensitivity and low sensitivity pixels are combined and are supplied to an HDR process. The combined images are then output to the image processor 124. That is, according to this embodiment of the present disclosure, by using both of the high-sensitivity and low sensitivity pixels at the same time, it becomes possible to bring the image into the HDR. In addition, since the exposure continues for a time period corresponding to one cycle of the traffic signal by using these high-sensitivity and low sensitivity pixels, the flicker can be either reduced or suppressed effectively. That is, the imaging unit 110 has a flicker reduction function.

Figure 9:
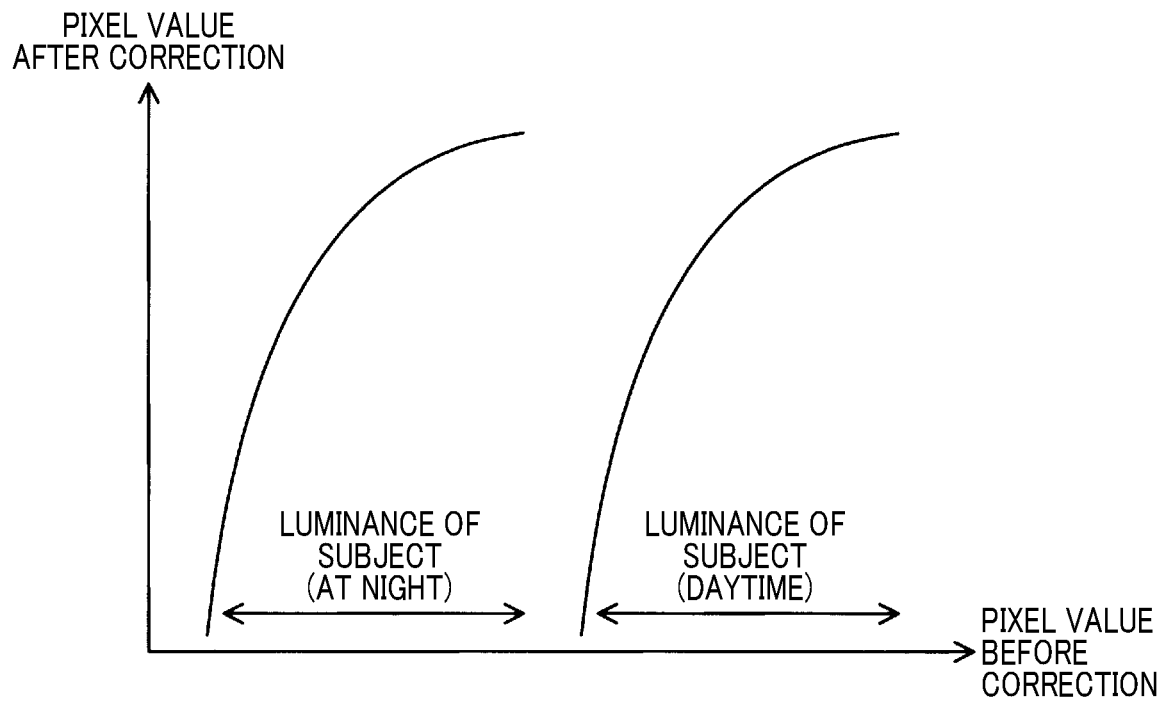
FIG. 9 is a diagram illustrating exemplary image correction processing implemented in the fourth embodiment of the present disclosure.

Further, according to one embodiment of the present disclosure, as illustrated in FIG. 9, the image processor 124 applies tone adjustment to an image already brought into the HDR by the imaging unit 110. Specifically, in accordance with a pixel value (i.e., a brightness value) of the image, a different tone adjustment is applied. For example, when the pixel value ranges from a value 0 to a value 255, pixel values from 0 to 127 are increased to pixel values from 128 to 255 to emphasize a dark image. In this way, a brightness of a dark area of an image, for example captured at night, is heavily emphasized. As a result, the image can be corrected to have a tone suitable for image recognition regardless of a time of imaging.

Further, in the HDR processing in this embodiment of the present disclosure, saturation of color can be avoided by controlling the imaging unit 110 to execute imaging, for example, by finely dividing the exposure time period in the imaging cycle. Otherwise, a capacitance can be provided in the imaging unit 110 not to generate the saturation even when the exposure time is prolonged.

Further, as dd earlier in one embodiment of the present disclosure, respective cycles of the blinking of the traffic signal and imaging are asynchronous with each other. However, in this embodiment of the present disclosure, since the exposure continues by using the high and low sensitivity pixels of the photodetector 114 and 116 for a time period corresponding to the blinking cycle of the traffic signal, the flicker can be yet suppressed even when these are synchronous with each other. Further, when the exposure time taken by the imaging unit 110 is less than the blinking cycle of the traffic signal, and the cycles of the respective blinking of the traffic signal and the imaging of the image are asynchronous with each other, a likelihood of occurrence of the flicker can be at least reduced. Further, the function of suppressing the flicker by making the respective cycles of the blinking of the traffic signal and the imaging of the image asynchronous with each other may also be applied to the camera system 100 employed in the first to third embodiment of the present disclosure.

Now, various exemplary connection systems connecting the camera system 100 with the ECU (electronic control unit) 170 are herein below described with reference to FIGS. 10 to 20. For example, the ECU 170 is installed in at least one of the vehicle controller 130, the sensor unit 140, and the recorder 160 illustrated in FIG. 1, and is used to control these devices. In the below described various connection system, it is preferable that the camera system 100 outputs each of frame images of the recognition and storage targets to the ECU 170 at a transfer rate of from 0.5 to 10 gigabyte per second, for example.

Figure 10:
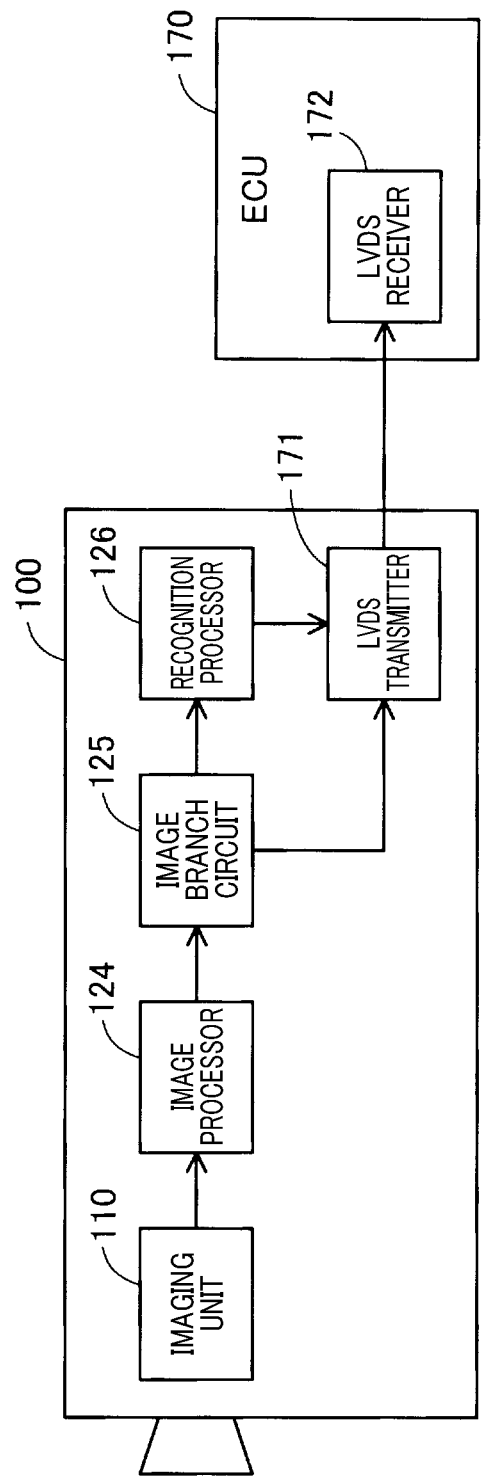
FIG. 10 is a diagram illustrating a first exemplary system of connection between a camera system and an ECU (Engine Control Unit) according to one embodiment of the present disclosure.

In a first connection system illustrated in FIG. 10, the camera system 100 and the ECU 170 are connected to each other via a LVDS (a low vibration amplitude differential signal system) transmitter 171 and a LVDS receiver 172. Between the image processor 124 and the recognition processor 126, an image branch circuit 125 is provided. Hence, in the first connection system, an image output from the image processor 124 is branched by the image branch circuit 125 before entering the recognition processor 126 and enters the ECU 170 through the LVDS transmitter 171.

Figure 11:
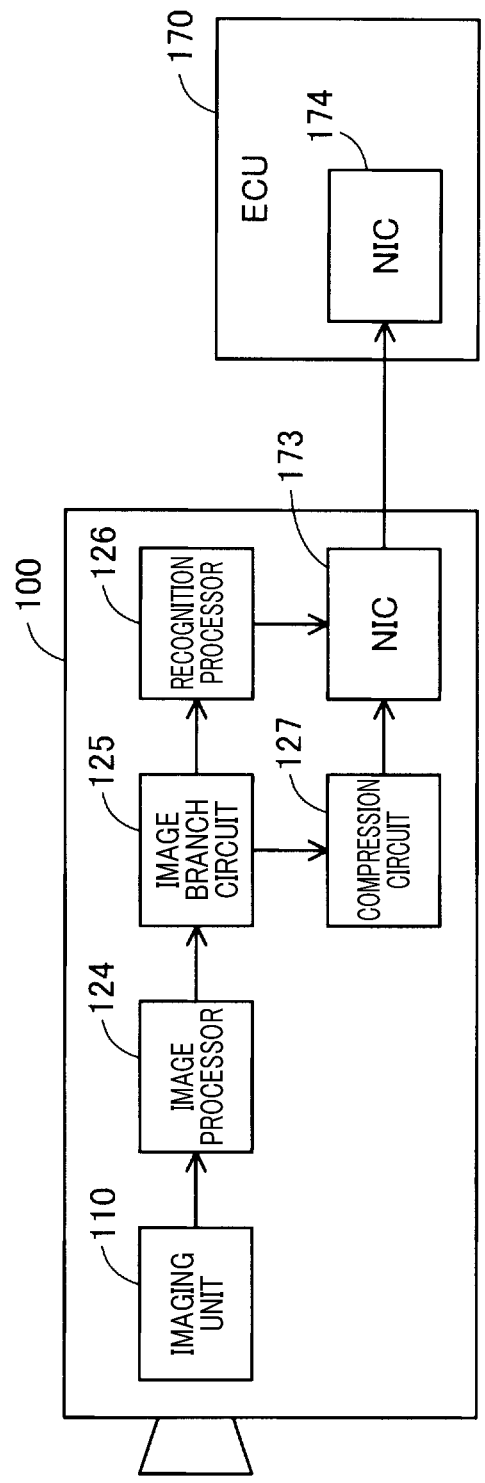
FIG. 11 is a diagram illustrating a second exemplary system of connection between the camera system and the ECU according to one embodiment of the present disclosure.

Further, in a second connection system illustrated in FIG. 11, the camera system 100 and the ECU 170 are connected to each other via a pair of NIC (network interface controller) 173 and 174. A compression circuit 127 is provided between the image branch circuit 125 and the NIC 173. Hence, in this exemplary connection system of FIG. 11, an image output from the image processor 124 is compressed by the compression circuit 127 and is output to the ECU 170.

Hence, according to the above-described first and second connection systems, because the image processed by the image processor 124 is branched and output from the camera system 100, a picture suitable for making a record may be easily made. Hence, when a specification of the imaging element 112 is changed, for example, a picture having the same image quality can be readily made. In addition, since a given frame can be selectively output from images. For example, an imaging rate can be 120 fps, while an output rate can be 30 fps. In addition, an image recognition result obtained by the image recognition processor 126 can be attached to an image and is output together. Further, by either encrypting an image or generating a signature for the image in the image branch circuit 125 and/or the compression circuit 127, for example, authenticity of the output image can be guaranteed.

Figure 12:
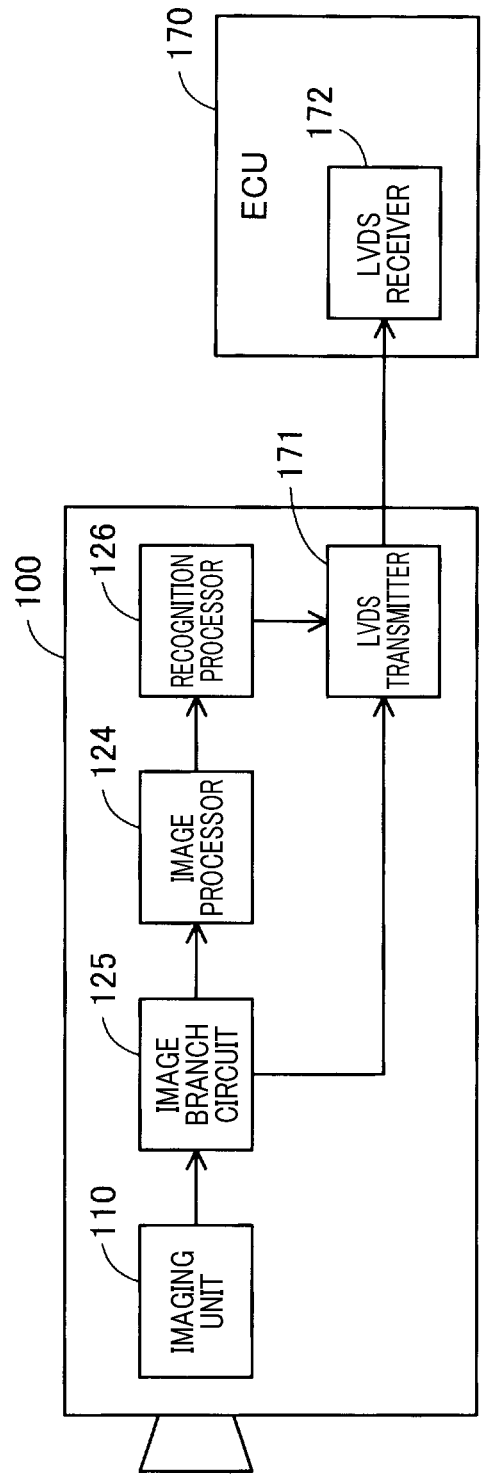
FIG. 12 is a diagram illustrating a third exemplary system of connection between the camera system and the ECU according to one embodiment of the present disclosure.
Figure 13:
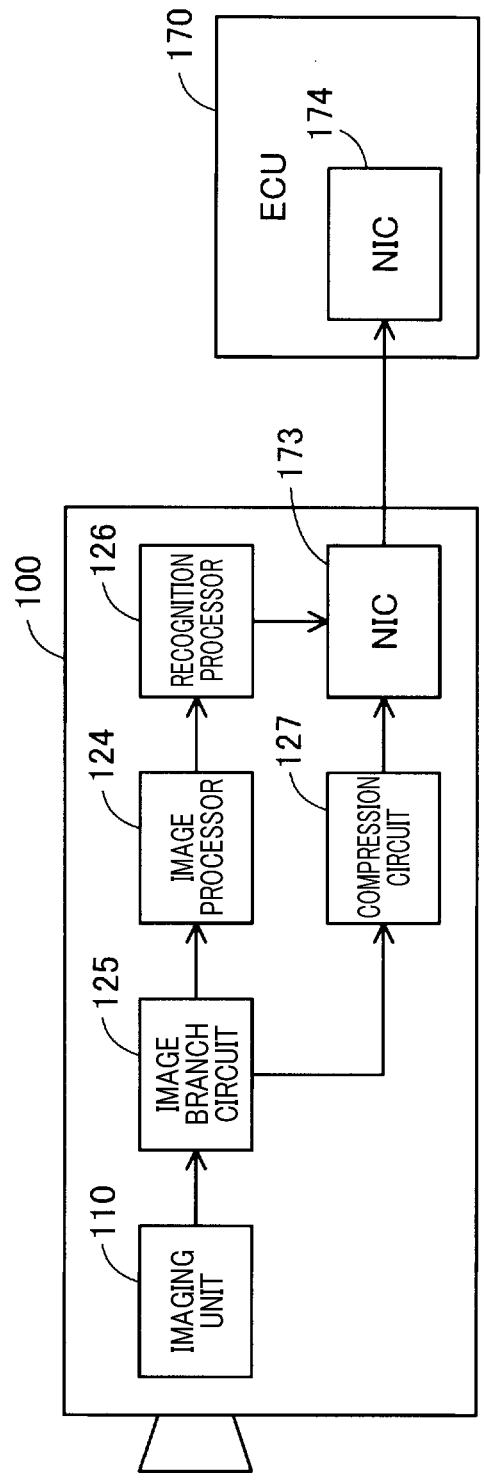
FIG. 13 is a diagram illustrating a fourth exemplary system of connection between the camera system and the ECU according to one embodiment of the present disclosure.

Further, in a third connection system illustrated in FIG. 12, the image processor 124 and the image branch circuit 125 are oppositely placed to those placed in the first connection system illustrated in FIG. 10. Further, in a fourth connection system illustrated in FIG. 13, the image processor 124 and the image branch circuit 125 are oppositely placed to those placed in the second connection system illustrated in FIG. 11. Hence, also with these configurations, a given frame can be selectively output from images. In addition, an image recognition result obtained by the image recognition processor 126 can be attached to an image and is output together.

Figure 14:
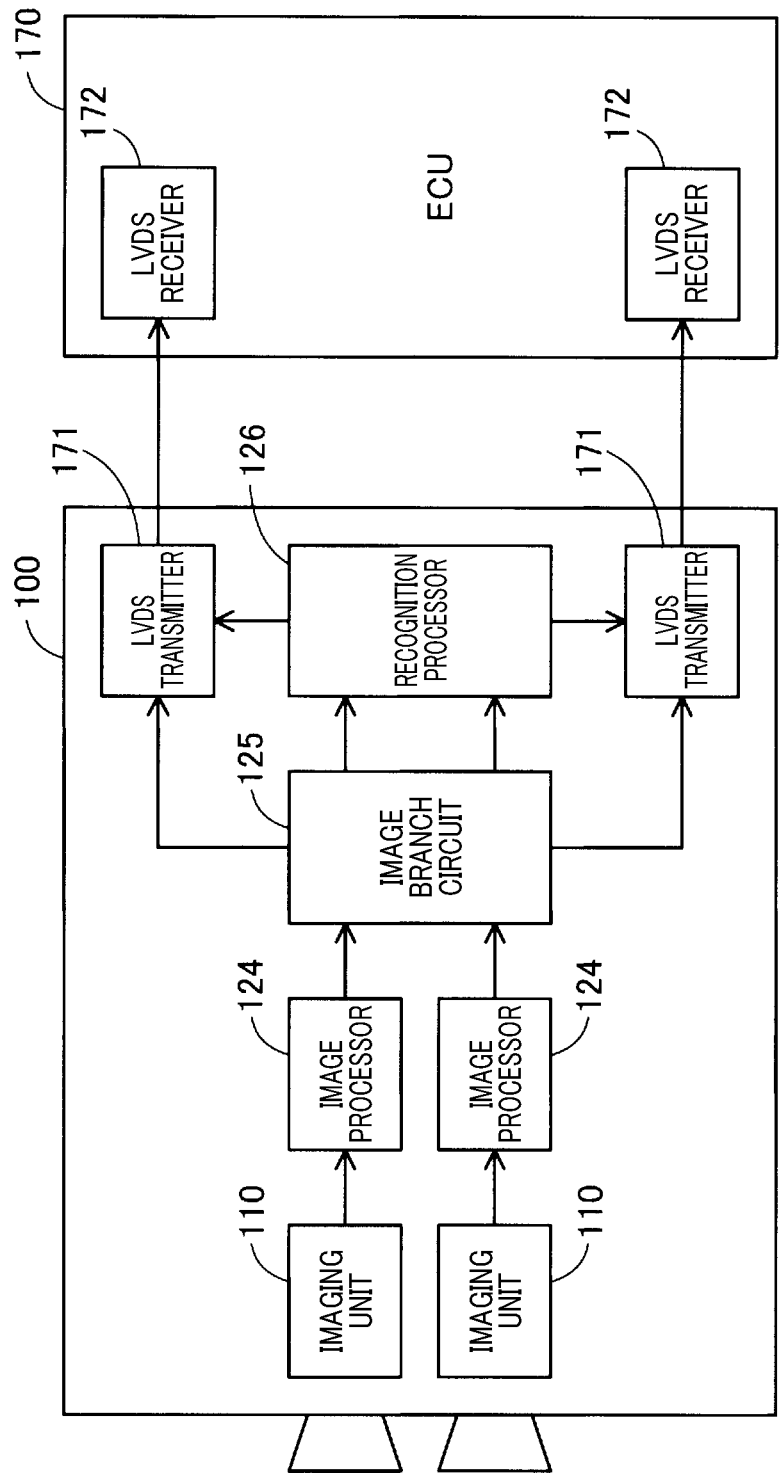
FIG. 14 is a diagram illustrating a fifth exemplary system of connection between the camera system and the ECU according to one embodiment of the present disclosure.
Figure 15:
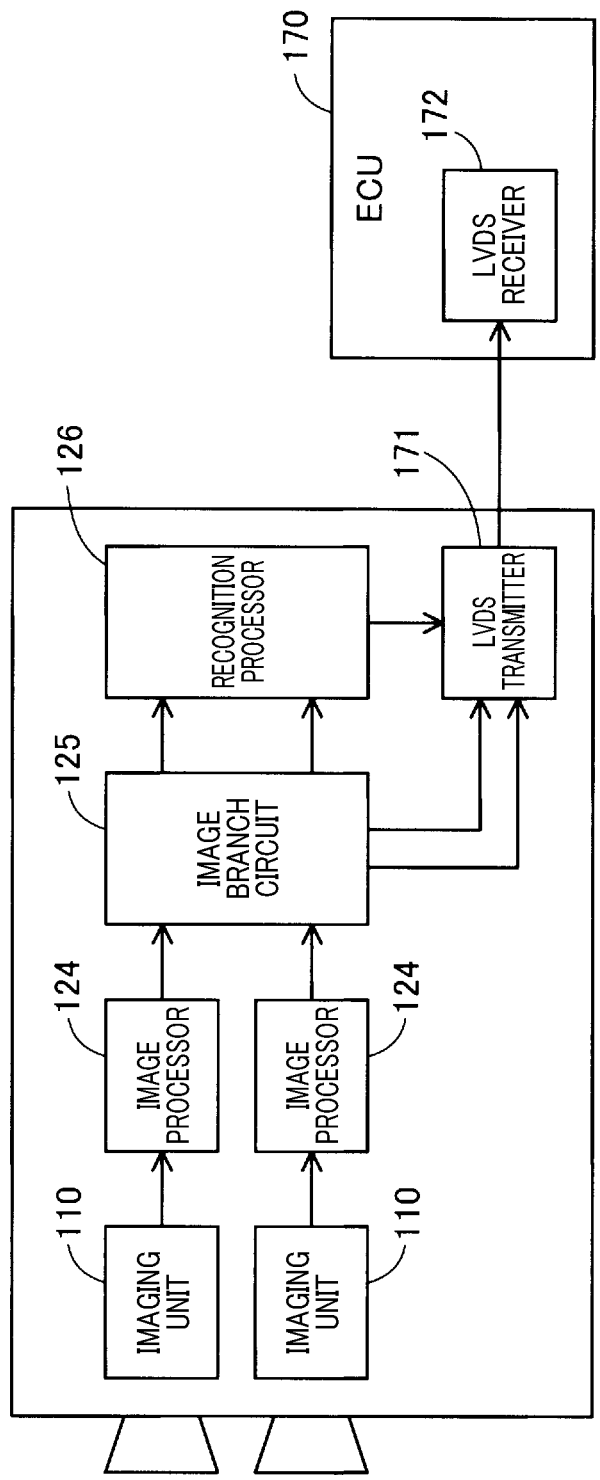
FIG. 15 is a diagram illustrating a sixth exemplary system of connection between the camera system and the ECU according to one embodiment of the present disclosure.
Figure 16:
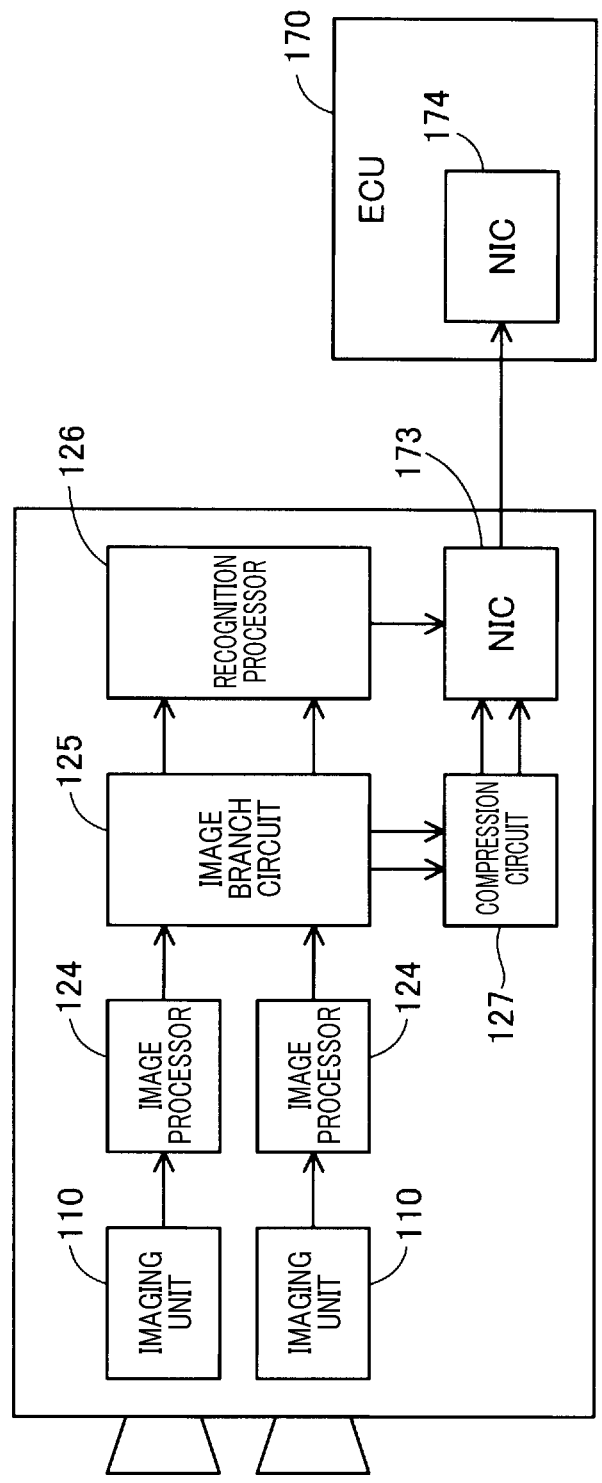
FIG. 16 is a diagram illustrating a seventh exemplary system of connection between the camera system and the ECU according to one embodiment of the present disclosure.
Figure 17:
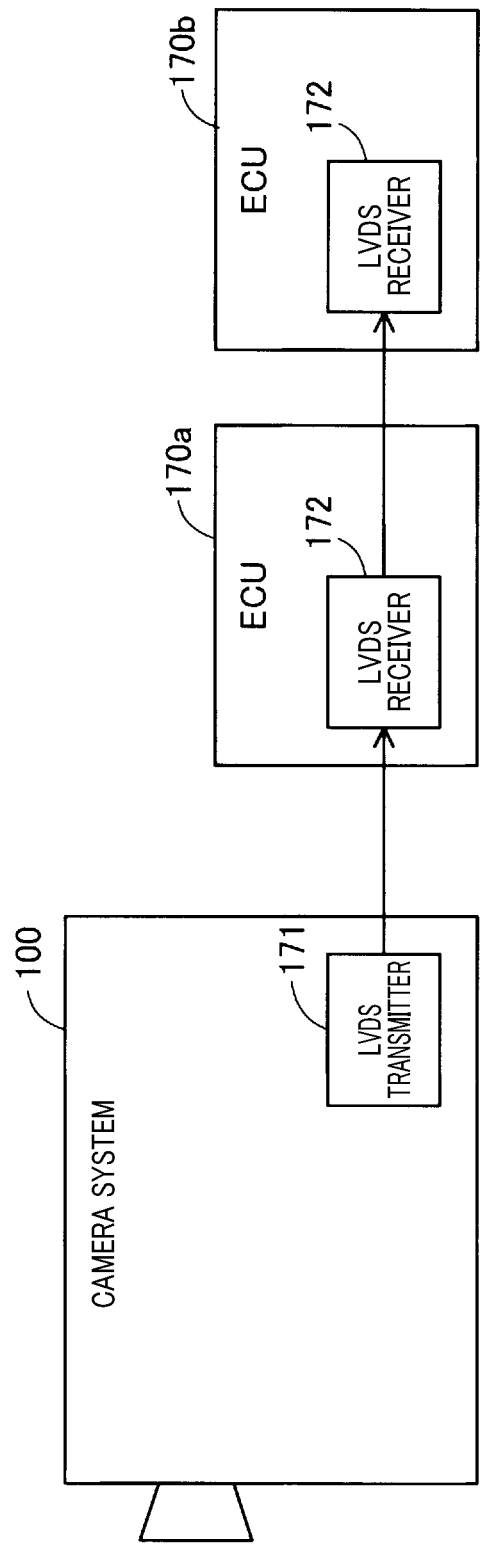
FIG. 17 is a diagram illustrating an eighth exemplary system of connection between the camera system and the ECU according to one embodiment of the present disclosure.
Figure 18:
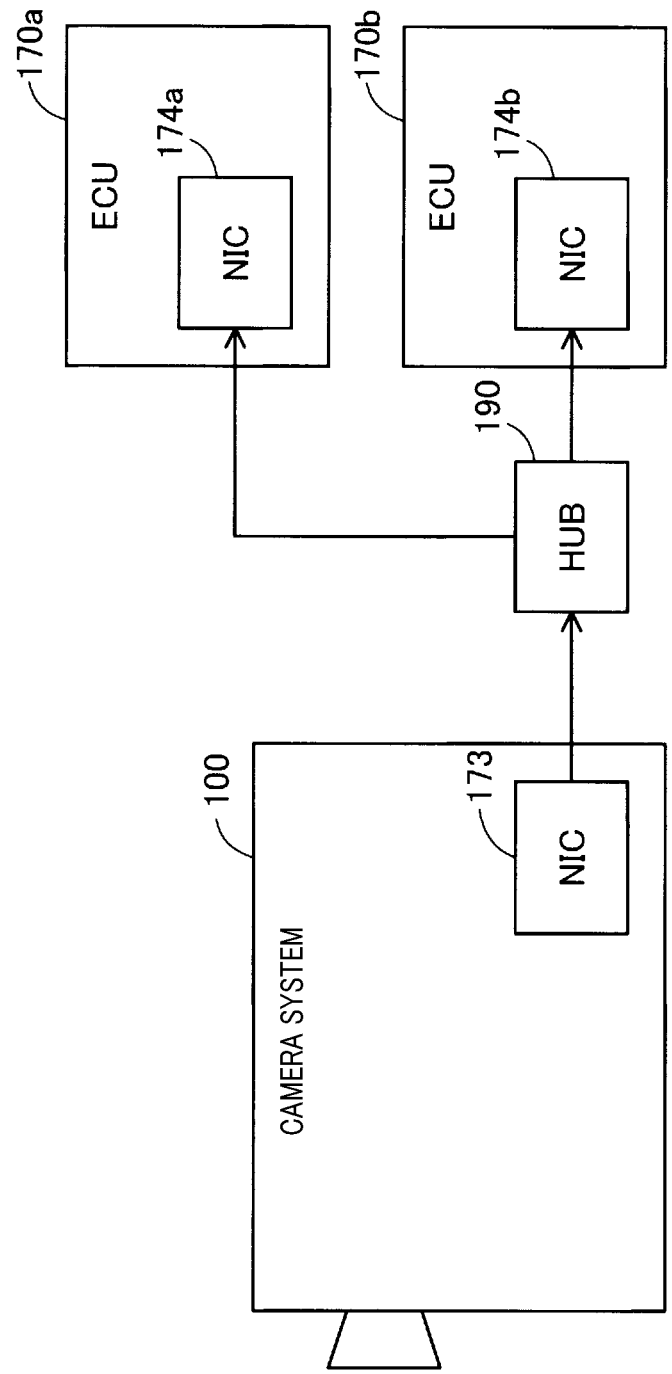
FIG. 18 is a diagram illustrating a ninth exemplary system of connection between the camera system and the ECU according to one embodiment of the present disclosure.

Further, in each of FIGS. 14 to 16, an exemplary camera system 100 provided with multiple imaging units 110 is illustrated. In particular, in the fifth connection system illustrated in FIG. 14, images captured by multiple imaging units 110 are output to a single ECU 170 via a common image branch circuit 125 and different plural routes each composed of a LVDS transmitter 171 and a LVDS receiver. Further, in a sixth connection system illustrated in FIG. 15, images captured by multiple imaging units 110 are multiplexed in a single LVDS transmitter 171 and is output to the ECU 170. Further, in a seventh connection system illustrated in FIG. 16, respective images captured by multiple imaging units 110 are compressed by a compression circuit 127 and are output via the pair of NICs 173 and 174 to the ECU 170. Hence, in each of the camera systems 100 having respective configurations illustrated in FIGS. 14 to 16, when the pair of imaging units 110 perform imaging in synchronism with each other and apply panoramic composition to images, a panoramic image can be obtained and output to the ECU 170. Further, in each of FIGS. 14 to 16, although the image branch circuit 125 is placed between the image processor 124 and the recognition processor 126, the present disclosure is not limited thereto and the image branch circuit 125 may be located between the imaging unit 110 and the image processor 124 as well.

Further, in each of FIGS. 17 to 20, an exemplary connection system, in which multiple ECUs 170 are connected to a camera system 100 is illustrated. That is, in an eighth connection system illustrated in FIG. 17, multiple ECUs 170a and 170b are connected serially by connecting a pair of LVDS receivers 172 adapted to daisy-chain connection with each other. Further, in a ninth connection system illustrated in FIG. 18, a switching hub 190 is placed between the camera system 100 and multiple ECUs 170a and 170b. Hence, a NIC 173 included in the camera system 100, a NIC 174a included in the ECU 170a, and a NIC 174b included in the ECU 170b relate to each other via the switching hub 190.

Figure 19:
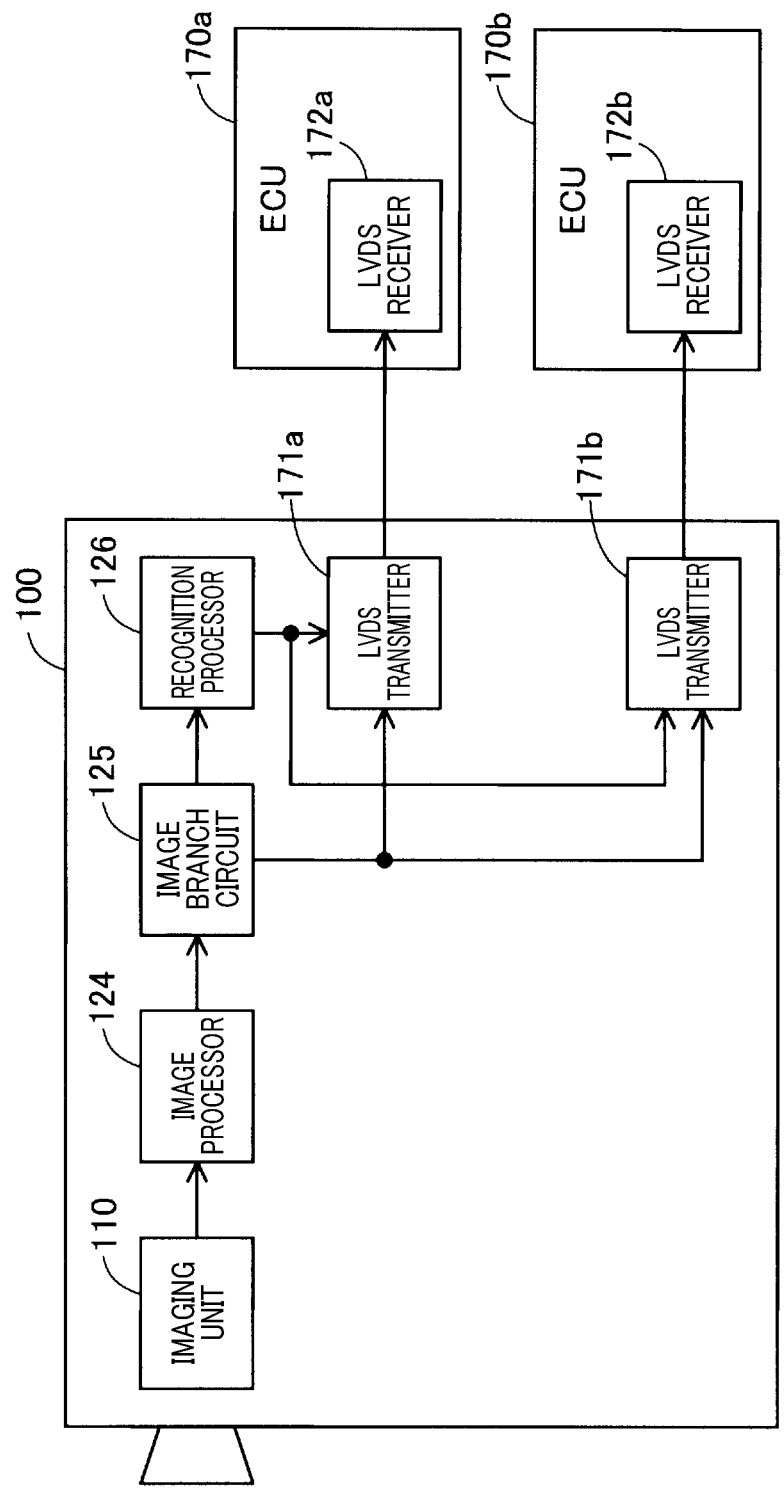
FIG. 19 is a diagram illustrating a tenth exemplary system of connection between the camera system and the ECU according to one embodiment of the present disclosure.
Figure 20:
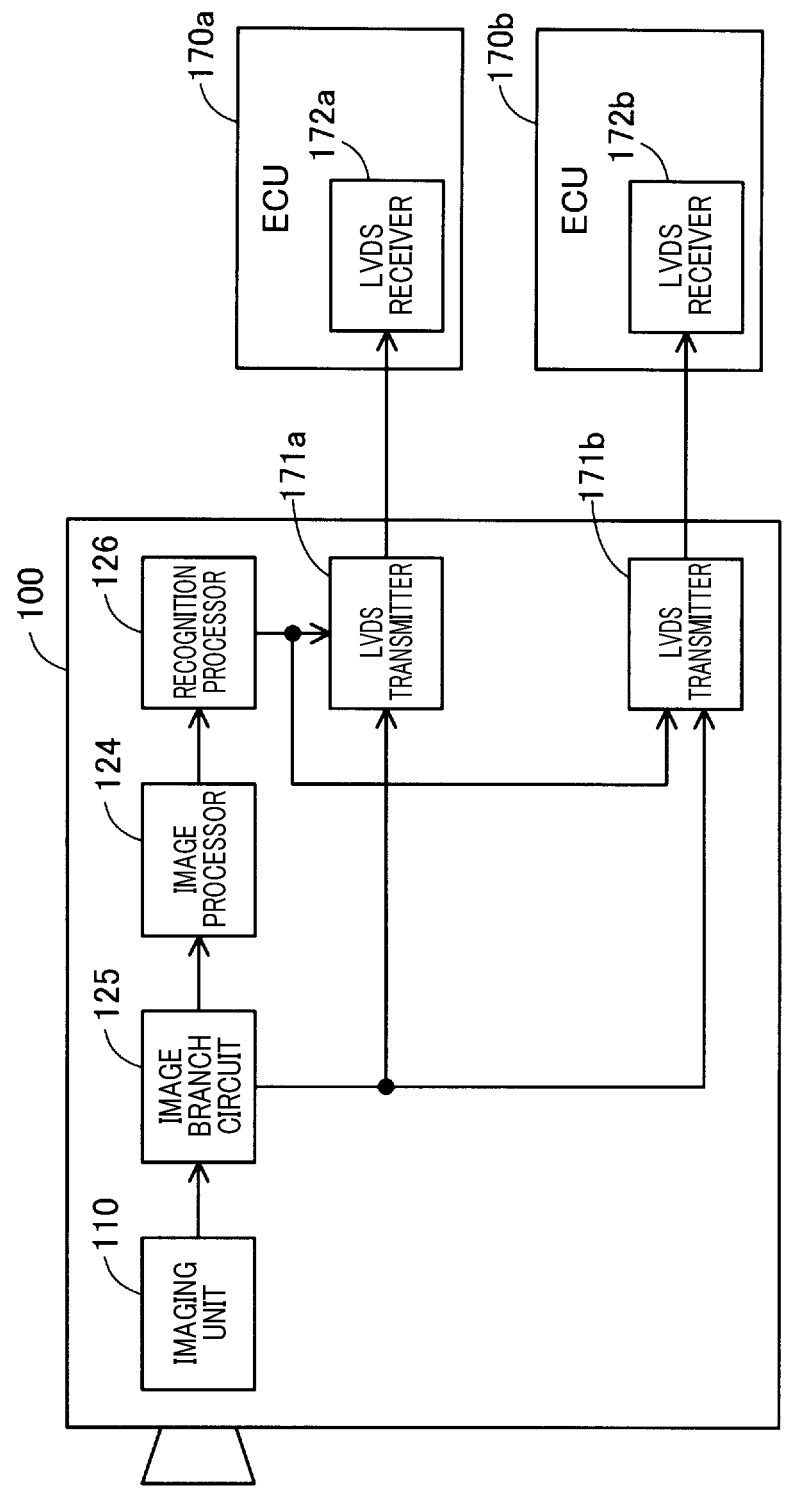
FIG. 20 is a diagram illustrating an eleventh exemplary system of connection between a camera system and an ECU according to one embodiment of the present disclosure.

In each of tenth and eleventh connection systems illustrated in FIGS. 19 and 20, to the camera system 100, the multiple ECUs 170a and 170b are connected in parallel via plural pairs of respective LVDS transmitters 171a and 171b and LVDS receivers 172a and 172b. As illustrated in FIG. 19, the image branch circuit 125 is placed between the image processor 124 and the recognition processor 126. By contrast, in the connection system of FIG. 20, the image branch circuit 125 is positioned between the imaging unit 110 and the image processor 124. Hence, as illustrated in FIGS. 19 and 20, an image signal is branched at the image branch circuit 125 and branched signals enter the respective LVDS transmitters 171a and 171b in parallel.

Hence, as illustrated in FIGS. 17 to 20, when an image is sent to multiple ECUs 170 from a single camera system 100, each of the multiple ECUs 170 can apply processing differently based on the same image.

Numerous additional modifications and variations of the present disclosure are possible in light of the above teachings. It is therefore to be understood that within the scope of the appended claims, the present disclosure may be executed otherwise than as specifically described herein. For example, the camera system is not limited to the above-described various embodiments and may be altered as appropriate. Similarly, the event recording system is not limited to the above-described various embodiments and may be altered as appropriate. Further, the event recording method is not limited to the above-described various embodiments and may be altered as appropriate again.

What is claimed is:

1. A camera system mountable on a vehicle, comprising:
   an imaging unit configured to capture multiple frame images of an outside of the vehicle in a given cycle, the imaging unit outputting in the given cycle:
      a first given number of frame images each determined to be a recognition target for recognition processing by a recognition processor;
      a second given number of frame images each determined to be both a storage target and a recognition target, each of the second given number of frame images being outputted as both the storage target and the recognition target at the same time so that the second given number of frame images are commonly used for both (i) recognition processing by the recognition processor, and (ii) storage by an image recorder; and
   an image processor configured to obtain the first given number of frame images and the second given numbers of frame images from the imaging unit, the image processor configured to separate the first given number of frame images and the second given numbers of frame images in accordance with a usage of the multiple frame images into:
      frame images for recognition processing by the recognition processor; and
      frame images to be stored in the image recorder,
   the image processor configured to output the frame images for recognition processing by the recognition processor and output the frame images to be stored to the image recorder,
   wherein
   the second given number is calculated by subtracting the first given number from a total number of the multiple frame images captured by the imaging unit.

2. The camera system as claimed in claim 1, wherein the frame images for recognition processing and the frame images to be stored have different image characteristics and the image processor applies different correction processing to each of the first given number of frame images and the second given number of frame images,
   wherein the image processor applies image correction to the first given number of frame images before outputting the first given number of frame images,
   the image processor generates the second given number of frame images by applying color conversion processing to the second given number of frame images already subjected to image correction before outputting the second given number of frame images.

3. The camera system as claimed in claim 2, wherein the image correction is gamma correction.

4. The camera system as claimed in claim 1, wherein the imaging unit has a flicker suppression function to reduce flicker caused when the imaging unit captures an image of a traffic signal blinking at a given interval.

5. The camera system as claimed in claim 4, wherein the flicker suppression function is a function to capture multiple frame images in a given cycle different from an integer multiple of a blinking cycle of the traffic signal.

6. The camera system as claimed in claim 1, wherein the imaging unit has a high-sensitivity pixel and a low sensitivity pixel having sensitivity lower than the high-sensitivity pixel, wherein the imaging unit generates the multiple frame images by combining images captured by using the high and low sensitivity pixels at the same time.

7. The camera system as claimed in claim 1, wherein the imaging unit captures the framed images at a frame rate of 10 to 60 frames per second, wherein the camera system outputs the frame images of the recognition target and the frame images of the storage target at a transfer rate of 0.5 to 10 gigabyte per second.

* * * * *